US010960871B2

(12) United States Patent
Bashayan

(10) Patent No.: US 10,960,871 B2
(45) Date of Patent: Mar. 30, 2021

(54) OXYGEN PRODUCING FLYING SCOOTER

(71) Applicant: Kholoud Bashayan, Riyadh (SA)

(72) Inventor: Kholoud Bashayan, Riyadh (SA)

( * ) Notice: Subject to any disclaimer, the term of this patent is extended or adjusted under 35 U.S.C. 154(b) by 348 days.

(21) Appl. No.: 16/085,016

(22) PCT Filed: Mar. 7, 2017

(86) PCT No.: PCT/SA2017/000007
§ 371 (c)(1),
(2) Date: Sep. 14, 2018

(87) PCT Pub. No.: WO2017/176174
PCT Pub. Date: Oct. 12, 2017

(65) Prior Publication Data
US 2019/0084550 A1    Mar. 21, 2019

(30) Foreign Application Priority Data
Apr. 6, 2016 (SA) .................................. 116370507

(51) Int. Cl.
*B60V 3/02* (2006.01)
*B60L 53/00* (2019.01)
(Continued)

(52) U.S. Cl.
CPC ............... *B60V 3/02* (2013.01); *B60K 26/02* (2013.01); *B60K 35/00* (2013.01); *B60L 8/003* (2013.01);
(Continued)

(58) Field of Classification Search
CPC .... B60V 3/02; B60V 1/10; B60V 1/14; B60V 1/18; B60L 53/00; B60L 8/003;
(Continued)

(56) References Cited

U.S. PATENT DOCUMENTS 3,150,847 A    9/1964  Moore et al.
4,528,947 A *  7/1985  Olivera ................... F02B 43/10
                                                        123/3

(Continued)

FOREIGN PATENT DOCUMENTS

CA    2 844 721 A1    9/2015
CN    202264884 U    6/2012

OTHER PUBLICATIONS

International Search Report of PCT/SA2017/000007 dated Jun. 13, 2017 [PCT/ISA/210].

(Continued)

*Primary Examiner* — Rodney A Bonnette

(57) ABSTRACT

The present invention relates to flying scooter comprising a base made of fibreglass, 20 fans with 20 motors connected to a power system with components comprising capacitors, batteries, photovoltaic solar cells, an oxygen generator, a regulator, electronic sensors, and electronic chips. The scooter has a circular front part that includes a display that gives operational levels of the components, and the base has a cavity for the passenger's legs, and a rubber strap for securing the passenger. Manual controls are provided as well as a grip for the controls. The controls are connected to the sensors and electronic chips wirelessly.

11 Claims, 5 Drawing Sheets

(51) Int. Cl.
| | |
|---|---|
| *B64C 27/20* | (2006.01) |
| *B64D 27/24* | (2006.01) |
| *B60L 8/00* | (2006.01) |
| *B64C 39/02* | (2006.01) |
| *B60K 26/02* | (2006.01) |
| *B60K 35/00* | (2006.01) |
| *B60Q 9/00* | (2006.01) |
| *B60V 1/10* | (2006.01) |
| *B60V 1/14* | (2006.01) |
| *B60V 1/18* | (2006.01) |
| *G05D 1/02* | (2020.01) |
| *G08G 1/16* | (2006.01) |
| *B64D 13/06* | (2006.01) |

(52) U.S. Cl.
CPC .............. *B60L 8/006* (2013.01); *B60L 53/00* (2019.02); *B60Q 9/008* (2013.01); *B60V 1/10* (2013.01); *B60V 1/14* (2013.01); *B60V 1/18* (2013.01); *B64C 27/20* (2013.01); *B64C 39/026* (2013.01); *B64D 27/24* (2013.01); *G05D 1/0214* (2013.01); *G08G 1/166* (2013.01); *B60K 2026/029* (2013.01); *B60K 2370/152* (2019.05); *B60K 2370/186* (2019.05); *B64D 2013/0677* (2013.01); *Y02T 10/64* (2013.01); *Y02T 10/7072* (2013.01); *Y02T 50/50* (2013.01); *Y02T 50/60* (2013.01)

(58) Field of Classification Search
CPC ......... B60L 8/006; B60K 26/02; B60K 35/00; B60K 2370/152; B60K 2370/186; B60K 2026/029; B60Q 9/008; B64C 27/20; B64C 39/02; B64D 27/24; B64D 2013/0677; G05D 1/0214; G08G 1/166; Y02T 10/64; Y02T 10/7072; Y02T 50/50; Y02T 50/60

See application file for complete search history.

(56) References Cited

U.S. PATENT DOCUMENTS

| | | | |
|---|---|---|---|
| 10,239,615 B2* | 3/2019 | Duru | B64C 15/12 |
| 2010/0300787 A1* | 12/2010 | Ardern | A63G 25/00 |
| | | | 180/117 |
| 2016/0052503 A1* | 2/2016 | Howell | B60V 1/14 |
| | | | 180/117 |
| 2016/0264121 A1* | 9/2016 | Dezen | B60V 1/15 |
| 2017/0174335 A1* | 6/2017 | Malloy | B64C 27/08 |
| 2018/0162345 A1* | 6/2018 | Tian | B63B 7/08 |
| 2020/0148333 A1* | 5/2020 | Randall | B64C 27/473 |
| 2020/0298815 A1* | 9/2020 | Dei Castelli | B60V 1/14 |

OTHER PUBLICATIONS

Written Opinion of the International Searching Authority of PCT/SA2017/000007 dated Jun. 13, 2017 [PCT/ISA/237].
Written Opinion of the International Preliminary Examining Authority of PCT/SA2017/000007 dated Nov. 2, 2017 [PCT/IPEA/408].

* cited by examiner

OXYGEN PRODUCING FLYING SCOOTER

This application is a National Stage of International Application No. PCT/SA2017/000007, filed Mar. 7, 2017, claiming priority based on Saudi Arabian Patent Application No. 116370507, filed Apr. 6, 2016.

BACKGROUND

The present invention relates generally to environment-friendly electronic devices. In particular, the present invention relates to an oxygen-producing flying board which may be used as a new environment-friendly transport vehicle.

Transport vehicles are among the greatest potential sources of pollution worldwide as they represent 40% of the total pollution in the world that may harm the ozone layer. A significant source of such pollution is fossil fuels that have a major harm on the environment during combustion. This led me to contemplate about inventing a new environment-friendly transport vehicle that is mainly dependent on a hybrid machine and water and increases the oxygen in the atmosphere. What makes the present invention distinguished and significant as an alternative to existing technologies is the different features in comparison with the prior art. The following are the differences between the invention of the oxygen-producing flying board and the prior art:

U.S. Pat. No. 2,955,780 dated 10 Nov. 1960 discloses an aircraft that is able to hover in consistency with the flying conditions and depends on gas combustion to actuate the electrical motors in reverse to emit gas as an exhaust. However, the present invention uses an electricity generator that is dependent on batteries and solar power to decrease the imposed potential on the batteries to lower the possibility of battery blow up. The prior art documents do not disclose any oxygen source. Meanwhile, the present invention produces oxygen to moisten and filter the air during the transport process.

In further detail with respect to U.S. Pat. No. 2,955,780: (1) gas combustion is used to actuate the electrical motors in reverse to emit gas as exhaust. However, the present invention uses batteries and photovoltaic cells to actuate the motors; (2) the prior art does not provide a source of oxygen, while the present invention produces the oxygen; (3) the prior art uses two big propellers but the present invention uses a plurality of medium size propellers which are engineered and distributed to maintain equilibrium and safety; (4) the prior art provides an allocated vehicle for two persons with two seats but the present invention provides a place for one person who stands in a certain place; (5) the engine of the prior art depends on the internal combustion with the turn on code but the present invention uses electrical engine, photovoltaic cells and batteries.

U.S. Pat. No. 2,953,321 dated 20 Sep. 1960 discloses means to propel an individual through air flying in a controllable manner as the invention depends on providing a wing and the vehicle is enabled to conduct a vertical rising for taking off and hovering in the air, move horizontally, moving from the vertical to the horizontal direction and vice versa through body movements or pilot equilibrium as this depends on the pilot equilibrium concerning the direction to which he desires to lean with the edge and the air column with introducing a horizontal steering element to move the edge towards the leaning direction with respect to movement and directions. Thus, there is a difficulty in steering with the possibility to commit mistakes. However, the present invention depends on the movement, directions and automatic wireless control system with fixed buttons on the joysticks. This way is easy to learn and achieves the stability and the ability to have full control during driving.

In further detail with respect to U.S. Pat. No. 2,953,321: (1) regarding movement and directions, this prior art depends on pilot equilibrium concerning the direction to which he desires to lean with the edge and the air column with introducing the horizontal steering element to move the edge towards the leaning direction, but the present invention uses automatic wireless control system with fixed buttons on the joystick; (2) the prior art does not have any photovoltaic cells, but the present invention uses photovoltaic cells; (3) unlike the prior art, the present invention has an oxygen source; (4) the prior art has a big propeller in the form of a dial which may be a source of disturbance and harm for the passenger, but the present invention has a plurality of propellers to maintain the equilibrium.

US Patent Application Publication No. 2004/0094662 dated 20 May 2004: the art depends on fuel and has fuel tanks which are illustrated in figure "6a". However, the present invention is operated via electricity to solve the pollution issue. Moreover, the prior art uses stairs for helping the passenger to reach the driving pot of the vehicle which represents usage difficulty, but the present invention puts the users in an easy manner before the joysticks with their feet in an allocated place. Moreover, the prior art uses wings which makes the vehicle rise in the air with the difficulty to soar therewith and drive between the pedestrians on the roads. On the other hand, the present invention does not have wings and takes control of the maximum height limit of one meter which makes the invention more compatible for road driving. The prior art produces carbon dioxide as it depends on fuel combustion in its movement and the present invention produces oxygen, uses no fuel and emits no carbon in consistency with the 2030 Vision.

In further detail, the prior art vehicle employs covers or wheels for the vehicle to be driven on the ground. The present invention does not employ any covers or wheels as it is not a car or a craft. It is a flying board that lands on below brackets of fiberglass coated with rubber to maintain safe landing. The prior art uses stairs to help the passenger to reach the driving pot of the vehicle, but the present invention puts the users in the driving pot in a place that is more secure to put the feet in an allocated place and fasten them with belts. The prior art uses a magnetic system and magnetic induction as a permanent effect whose manufacturing is very expensive, but the present invention employs an automatic wireless system through electronic wireless chips receiving and transmitting the commands of operation, stopping and directions and such system is not expensive. The prior art employs wings which restricts the vehicle usage to the air as an aircraft, but the present invention is distinguished with the ability to be used as transport means through a flying board.

The prior art does not have any photovoltaic cells, but the present invention uses photovoltaic cells. The prior art produces carbon dioxide as it depends on the fuel combustion in its movement and the present invention produces oxygen.

A prior art product uses a jet engine and a jet propeller for movement which is very expensive and produces high noise and air jetting strong power. However, the present invention uses electrical engines and propellers for movement which enables the vehicle to be driven in a streamlined manner with no generated distribution for the passerby. The product rises for more than one meter which makes it dangerous for the user, but the present invention is of a low height with no risk to be fallen therefrom. Unlike the present invention, the product has no joystick.

SUMMARY

The present invention is related to an oxygen-producing flying board in the field of environment-friendly electronics. The oxygen-producing flying board according to an embodiment includes a fiberglass base with hollowed circles at the extremes, twenty propellers that can each bear ten kilograms and which are composed of blades, crane, moving hinges to move the propellers' blades in the desired direction, axes, grid and frame. Each propeller has a motor connected thereto with an electronic chip to receive and transmit wireless commands to direct the blades according to the given direction by the controller, a surrounding frame to the base to maintain its internal components, a hybrid machine comprising environment-friendly components, electrical batteries with a connected regulator, electronic sensors which are connected to a display, photovoltaic cells to decrease the imposed potential on the batteries, oxygen generator which maintains equilibrium on the two sides of the flying board and moistens the air, a front upon which the photovoltaic cells are fixed, a second base to cover the internal components with an allocated void for the feet to be fastened with a rubber belt, a hollowed base to fix joysticks, joysticks and four movement sensors to be installed on the extremes of the flying board which are connected to the controller in a wireless manner.

Therefore, there is provided a flying board on which a user can stand in the allocated position to adhere the feet to the joysticks. The joysticks include chips for the wireless signals with attached control buttons. They function as a connection means to a motor server which is attached to the wireless signals chips to transmit the commands to the controller and then to the attached wireless signals chips, which are attached to the propellers' motor, to take off, land and turn towards the right or the left direction. There are buttons to control directions, turn on and turn off buttons, directions arrows and hand holder which is installed above the joysticks. The invention is managed by a controller (micro controller) which is composed of controller (a) electricity or potential control, controller (b) distributing the electric potential incorporating controller a and b, software, display port displaying the oxygen and charge levels, joystick signals port which is connected to the propellers.

It is specified for receiving the commands signals of takeoff, landing and turning to right, left, above and below and the chips ports. The objective of the invention is to be used as an environment-friendly transport means. Further, the flying board decreases environment pollution as compared to the transport means that emit carbon dioxide, and moistens the air with oxygen during usage. The invention is used as an entertainment means or transport means in pilgrimage, war, craft and cars accidents and the hard places which are difficult to be reached via the other transport means such as the places of floods, earthquakes, hurricane or the narrow and hard roads. It is used in this case to transport the medicine and foods or to carry the injured people.

Moreover, the objective of the invention is to use the device in giving the opportunity to any ordinary individual to experience flying safely with a safe high level with no condition to be a pilot as the device driving is safe and user friendly. The present invention is distinguished with many uses in many fields. It is distinguished of installed sensors on the sides of the flying board to alert the user and avoid any undue crashes with the passer by. Additionally, the front part of the flying board is thick, higher than the base and maintains the user safety. The present invention employs photovoltaic cells as an operating part for the flying board and decrease the imposed potential on the batteries. There is a front display to indicate the battery charge lever and the machine heat level five minutes in advance of expiry so, the user will reduce the propellers speed and land in a specified and secure point.

DETAILED DESCRIPTION

Many objectives and features of the invention "Oxygen-Producing flying board" may be achieved through using the hybrid system including a battery and photovoltaic cells, and using electrical pumping and oxygen with a wireless digital system. The flying board is directed and managed via a controller as illustrated in FIGS. 1-4.

Figure 1:
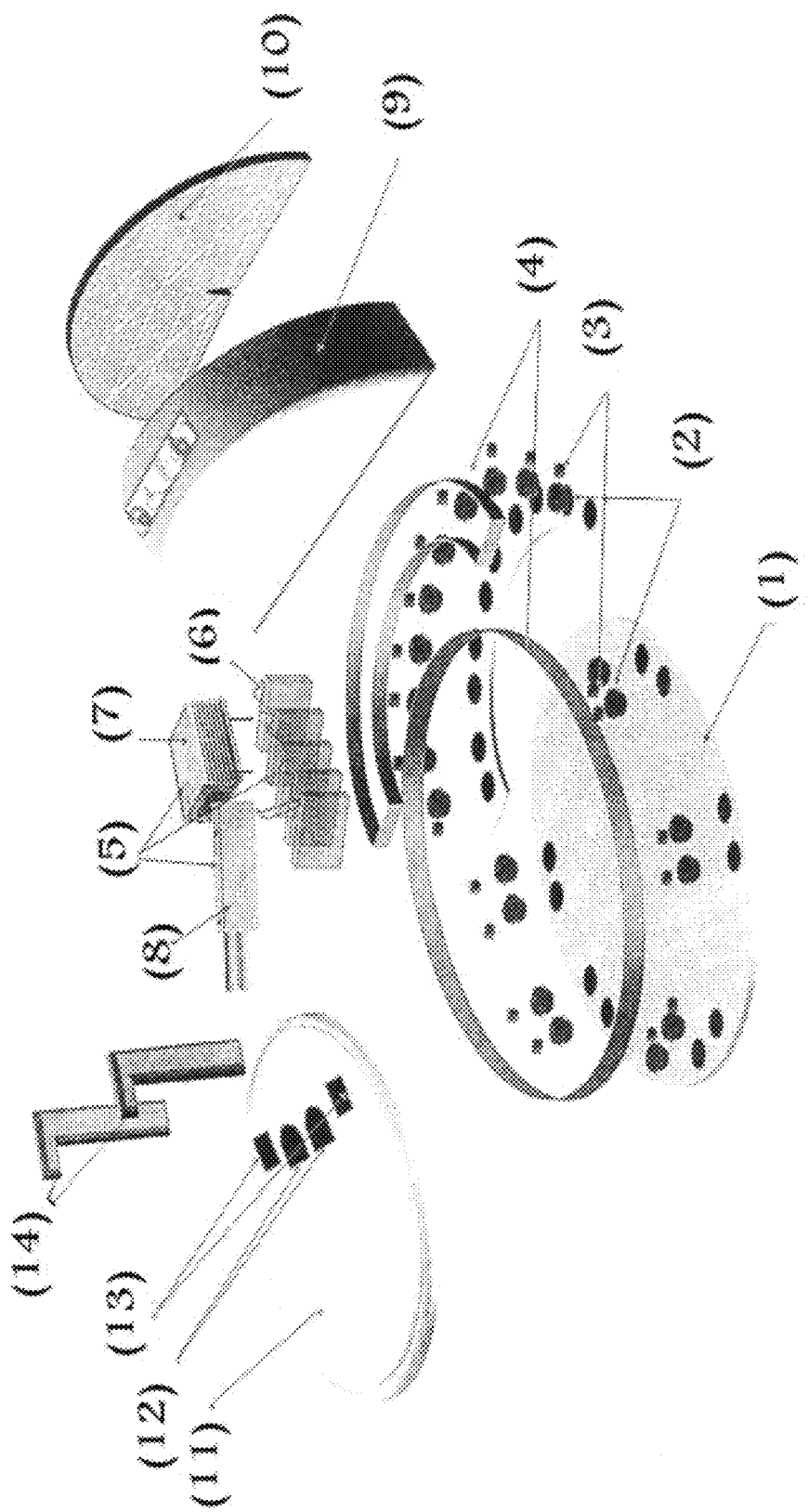
FIG. 1: illustrates the inner parts components of an oxygen-producing flying board according to an embodiment.
Figure 5:
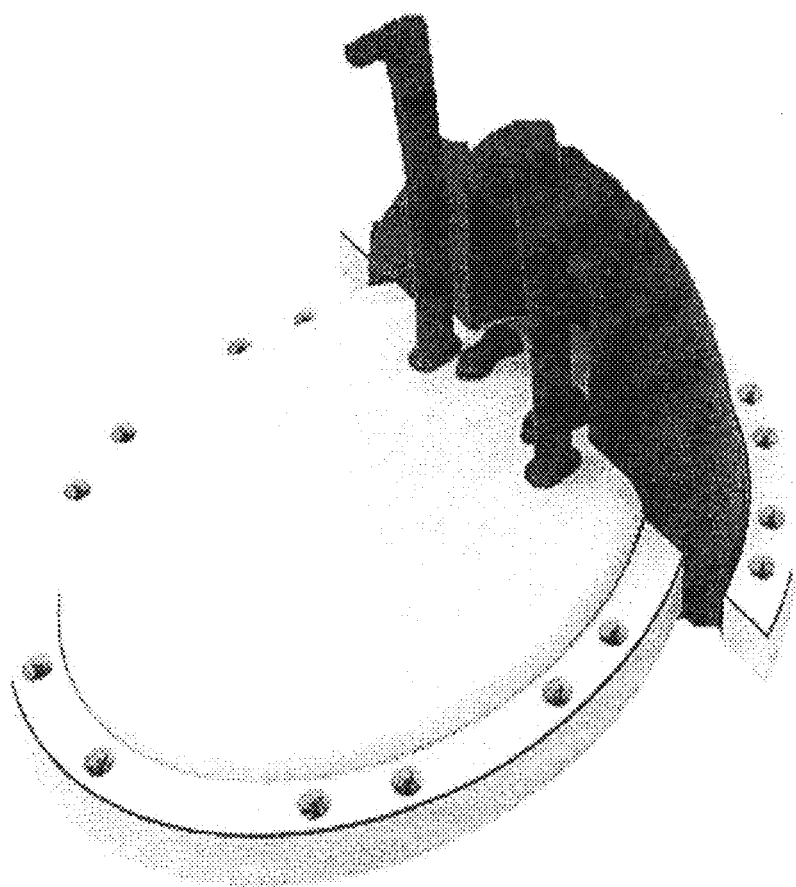
FIG. 5: is a perspective view of the flying board.

FIG. 1 illustrates the inner parts and components for the oxygen-producing flying board according to an embodiment, which is composed of a fiberglass base (1) with hollowed circles at the extremes, and 20 propellers (2). Each propeller has a motor (3) connected thereto with an electronic chip to receive and transmit wireless commands to direct the blades according to the given direction by the controller, a surrounding frame (4) to the base to maintain its internal components, a hybrid machine (5) comprising environment-friendly components, electrical batteries (6) with a connected regulator, electronic sensors which are connected to a display to indicate the charge level, photovoltaic cells (7) to decrease the imposed potential on the batteries, oxygen generator (8) which maintains equilibrium on the two sides of the flying board through spreading the oxygen via two hoses to moisten the air, a higher front than the base (9) with LCD display on it, upon which the photovoltaic cells (10) are fixed, second base (11) to cover the internal components, allocated void (12) for the feet and to be fastened with a rubber belt, a hollowed base (13) to fix the joysticks, joysticks (14). FIG. 5 shows the flying board as assembled.

Figure 2:
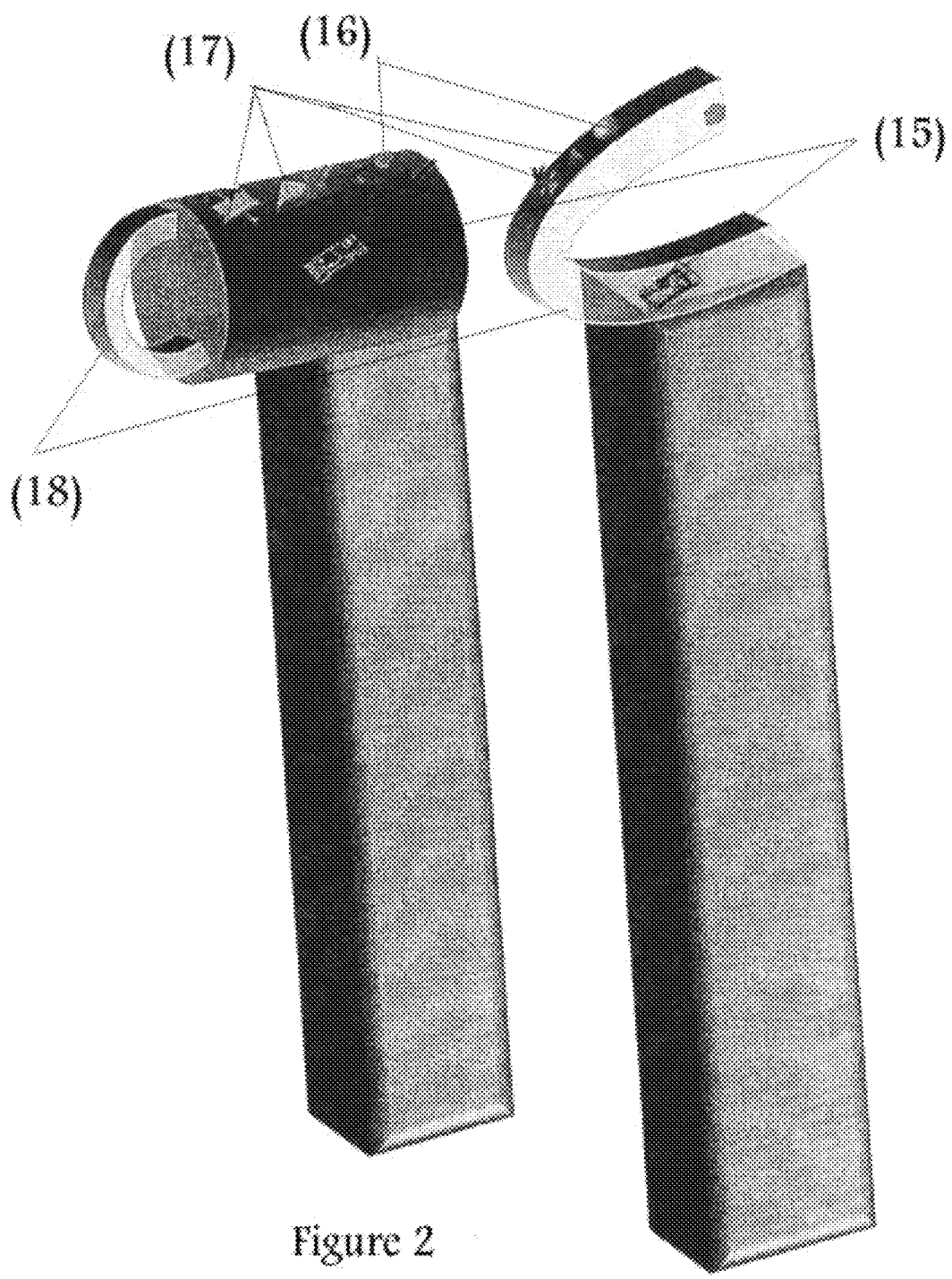
FIG. 2: illustrates the parts and components of the joysticks.

FIG. 2 illustrates the joysticks which are composed of electronics for the wireless signals with attached control buttons. They function as a connection means to a motor server which is attached to the wireless signals chips (15) to transmit the commands to the controller and then to the attached wireless signals chips, which are attached to the propellers' motor, to take off, land and turn towards the right or the left direction. The joysticks include turn on and turn off buttons (16), buttons to control directions, directions arrows (17), and a hand holder (18) which is installed above the joysticks.

Figure 3:
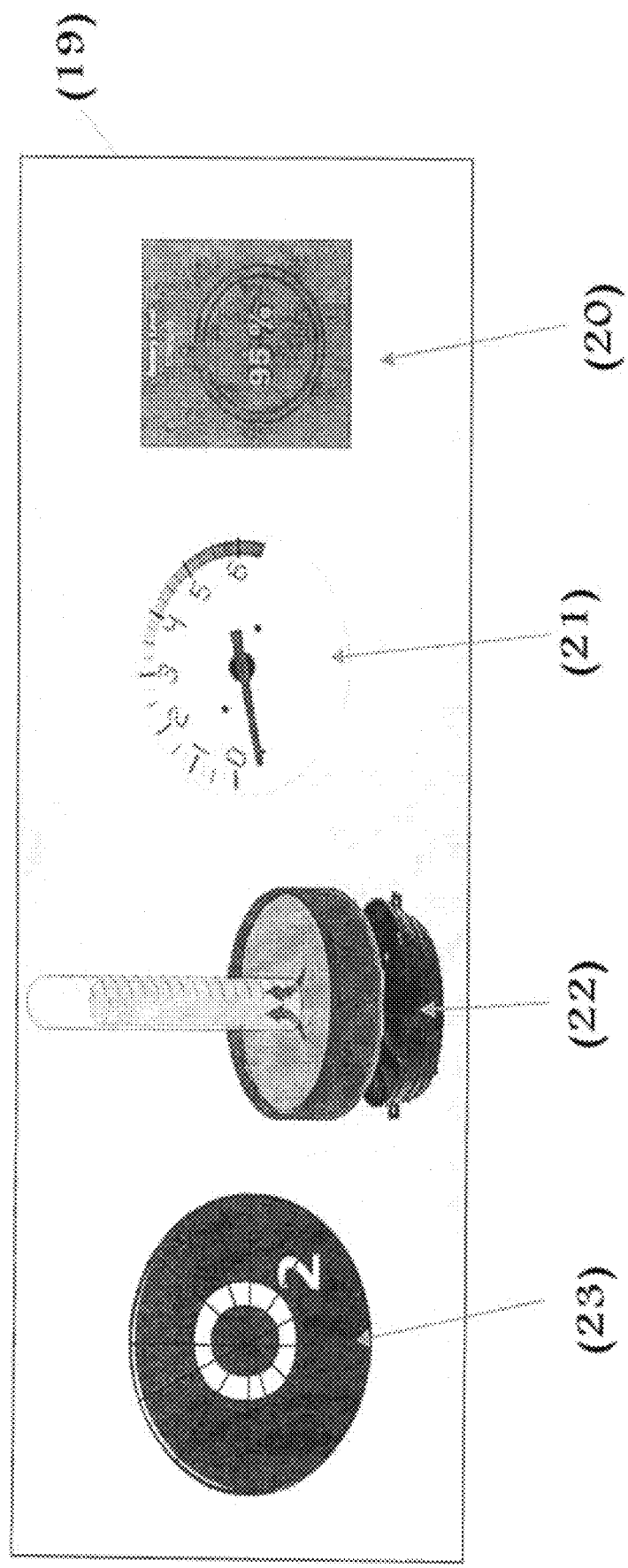
FIG. 3: illustrates the installed display above the front part.

FIG. 3 illustrates a front display (19) (such as an LCD display) to indicate the battery charge level (20), the speed level (21), the height level (22) and the oxygen level (23).

For example, the front display (19) indicates the aforementioned various information five minutes in advance of battery expiry (drainage) so the user will reduce the propellers speed through rising, landing or turning into right or left to achieve the equilibrium as per the transmitted commands.

Figure 4:
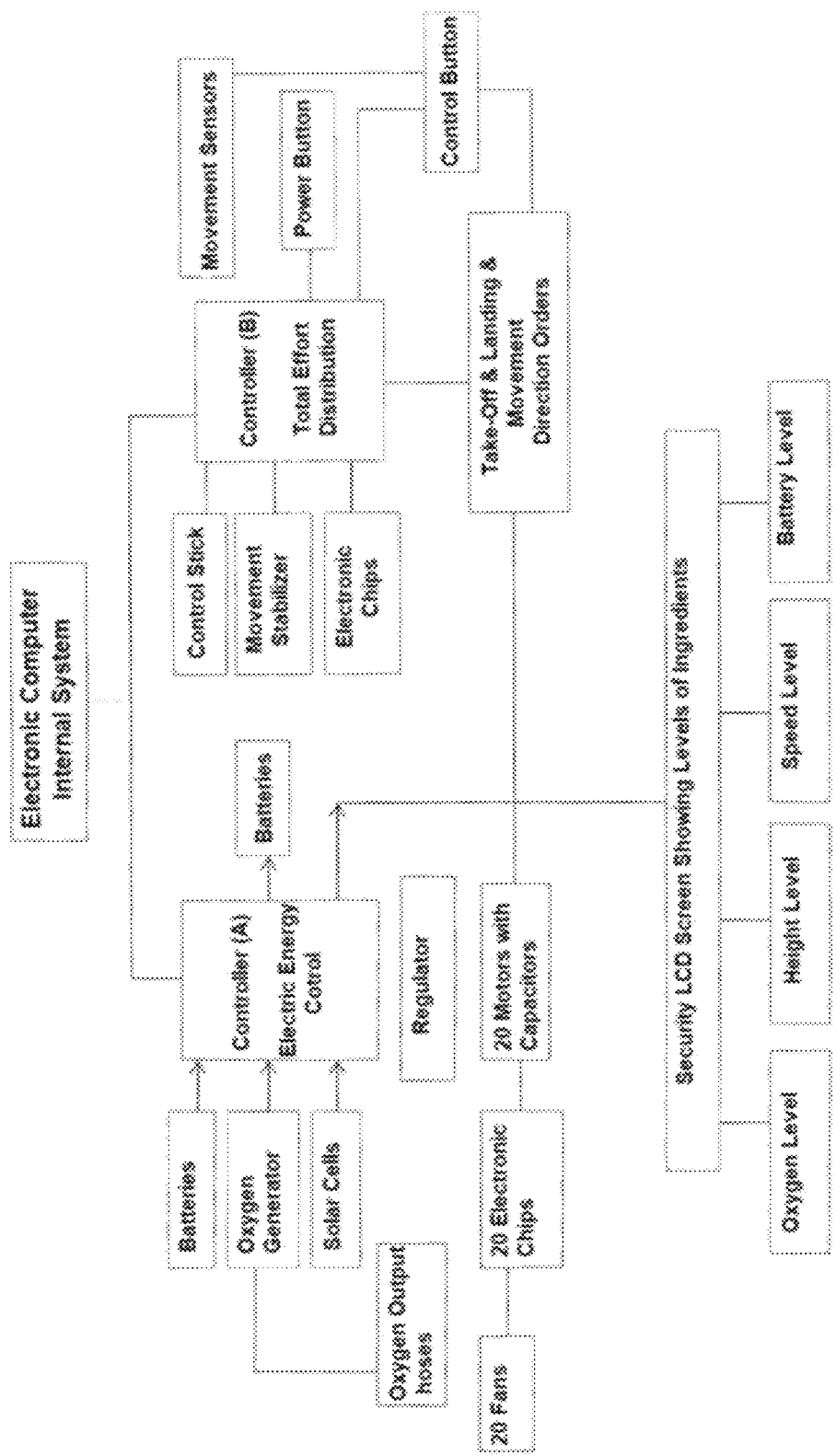
FIG. 4: illustrates the control unit which is composed of two controllers.

FIG. 4 is a block diagram of a control unit which is composed of controller (a) electricity or potential control, controller (b) distributing the electric potential incorporating controller a and b. FIG. 4 indicates a software and display port displaying the oxygen and charge levels, and joystick signals port which is connected to the propellers. It is specified for receiving the command signals of takeoff, landing and turning to right, left, above and below and the chips ports.

Some of the main components of the flying board according to an embodiment include: the photovoltaic cells shall provide the controller (a) "electricity controller" with electricity to reduce the imposed potential on battery which provides the controller (a) with electricity too. The extra electricity shall be stored to be used for a longer time with more power. Each battery is connected to a regulator and electronic sensors which are connected to the display to indicate the battery charge level. It automatically sends a signal to the controller five minutes in advance of the charge expiry so, the propellers speed may be reduced and the landing may be conducted in a safe manner. The electronic chips shall receive and transmit the wireless signals which receive the commands from the controller to operate or stop the propellers. The controller (b) is connected to the controller (a) to distribute the electric potential for: the joystick, turn on/off button, the direction buttons of above, below, left and right and it is connected to the electronic chips for the wireless signals with the function of transmitting the commands of taking off, landing and turning into right or left. The display shall indicate the battery charge level, as well as the speed level, the height level and the oxygen level (e.g., five minutes in advance of expiry so, the user will reduce the propellers speed through rising, landing or turning into right or left to achieve the equilibrium as per the transmitted commands). The oxygen device is branched with two coated hoses to the right and the left sides in order to spread the oxygen on the sides of the flying board to balance the movement and moisten the air. The installed sensors at the four corners of the flying board are used to alert the user of a potential collusion with proximate objects to the flying board.

The manufacturing is validated by depending on: 1—the pressure and movement laws, 2—the modem technology of the used wireless chips which are installed in the controller buttons and the servers of the propellers' motors, 3—the engineering design of the hybrid machine which includes environment-friendly components and photovoltaic cells to reduce the imposed potential on the battery and the oxygen which achieves equilibrium on the two sides of the flying board and moisten the air, 4—the engineering design of the propeller and interpreting the method of taking off and landing in accordance with the air movement and pressure laws, 5—each used propeller in this device bears its weight in average so the ordinary weight of the individual and the device weight shall be maintained. Moreover, the structure of the flying board is light and composed of the fiberglass as the oxygen generator and the arrangement of propellers around the flying board in an engineered fashion gives power to the propellers while maintaining the equilibrium and safety. The flying board belongs to the flying scooters technical category bearing the name of oxygen-producing flying board. It is not a car as it has no covers and not an aircraft as it has no wings. However, it has an engineering design to be safe in use and employs a hybrid machine as it has two sources of power with an oxygen producing device to be environment-friendly and to prove that our country does not depend on oil only.

The following components show that the invention may be manufactured and operated in an innovative manner. The joystick (the technology of wireless communication and receiving and transmitting the commands through wireless connection): it features the turn on button and buttons corresponding to the directions of up, down, right and left. Each button has chips and/or circuitry for the wireless signals as a wireless controller that is in charge of or controls the propellers operation in the required direction to maintain more safety and equilibrium. There are a plurality of medium size propellers (twenty, according to an embodiment), which are distributed in an engineered manner to propel the board vertically with an impetus forward or to any of the two sides with changing the movement of the propellers' blades with a vibration damper in respect of the rising and swinging. The modem turning systems use the basics of the above turning systems. Some of the turning axes function as a moving axis that allows the blade lean and makes the blade flexible with no need for brackets or hinges. Such systems are called flexure i.e., flex-mixture (4) and are manufactured from a mix of raw materials. The flexible brackets are made from rubber and have a limited movement and suitable for the craft applications. They may be used instead of the traditional brackets and they do not need lubrication and are easy to maintain. Moreover, they absorb the vibrations which means less effort and longer life time for the craft spare parts. The maximum air speed of the craft is designed with a value called "Velocity, Never Exceed VNE". The craft has a motor including an electronic chip to receive and transmit wireless commands and signals, which are used in the aircrafts, to direct the blades as per the given direction from the joystick which includes also the turn on and direction buttons with electronic chips for wireless connection to a motor server. Safe driving is provided by fastening the two hands and feet of the user in the hollowed specified place for the user feet and apply the rubber belt on the feet at the same time. The propellers lean in accordance with the given direction by the passenger through the controller buttons which are fixed on the joysticks. Thus, the traction power tracks the flying board in the desired direction in a wireless way through the installed electronic chip in the controller which connects the internal components of the machine.

Explaining the taking off process in accordance with the relation between the speed and taking off pressure: the passenger shall press the turn on button and then the taking off button to give commands and wireless signals to the installed chips in the motors of the propellers' blades to change the angle. Thus, a lifting power shall be generated on all propellers to be raised as the air flow speed shall be reduced below and the air pressure shall be increased in the lower plane leading to a lifting power to be generated as the relation between the speed and pressure is in reverse. Therefore, the air speed shall be increased above and the affecting pressure on the upper plane shall be decreased leading to a generated power to lift the body and cause the flying board to fly in a vertical manner as a result of the continuous movement of the blades. The passing air currents around the blades are of different speed with respect to the above and below parts of the blade. Such difference shall be increased with the increase of the blade lean, i.e., the angle between the blade and the air flow direction which is called the angle of attack. The different speed shall lead to a different air pressure with respect to the above and below parts of the blade as the pressure will be more than normal below the blade and less than normal above the blade. The electrical engine is a brushless motor that transfers the charge directly through a metal wire around the generator with three outputs in the form of three wires, i.e. positive wire, negative wire and a third wire for pulses to control the speed of the flying board. According to an embodiment, there are 20 motors.

The flying board uses a hybrid system which is a unique hybrid machine in the scooter field and has not been used before. It is based on the innovative concept of using three components: battery, the photovoltaic cells to save the excess power and to give power to the propellers to apply the flying theory while making equilibrium against the air pressure. The flying board uses electrical propulsion and oxygen with the wireless digital system and the vertical position of the propellers enables the propulsion to be generated above, air flow and safe landing. The distributed electric propulsion generates air resistance to slow the propelled air and the electrically driven propellers endure the variant air flow and are relatively small in size in order to be positioned in a place to have a benefit from the air flow which inevitably resists the flying board. Thus, there is no need for additional design to handle the air resistance. "Through the electrical engines, we can take a benefit from the actual energy consumption in driving the vehicle to avoid consuming more energy in another place thus, we increase the total efficiency." In fact, any process of replacing the jet aircrafts with electricity helps in reducing the greenhouse emissions which have a negative impact on the environment.

The invention claimed is:

1. A flying board as a transport vehicle for at least one individual, the flying board comprising:
    an oval base with a front, higher than a top surface of the oval base, coated with photovoltaic cells;
    a fixed LCD display above the front higher than the base to indicate a battery charge level, a speed level, a height level and an oxygen level;
    circle voids on sides of the oval base;
    an internal cavity in the center of the oval base;
    a plurality of fixed electrical propulsion propellers inside the hollowed circle voids;
    a plurality of electrical engines which are operated via chargeable batteries, as the plurality of electrical engines are positioned beside the plurality of the fixed electrical propulsion propellers;
    an oxygen generator which is operated via generated electrical power through the photovoltaic cells as the oxygen generator is positioned inside the internal cavity of the oval base as it jets the oxygen as a result of non-exothermic chemical reaction through two fixed flows on left and right sides of the oval base to generate a rising power and maintain the movement equilibrium;
    installed controllers beside the plurality of the electric engines and the oxygen generator to control the plurality of electric engines and the oxygen generator; and
    a cover for the internal cavity,
    wherein an allocated position for passenger feet is externally provided with a rubber belt to fasten the passenger feet,
    wherein installed joysticks are provided on the oval base with turn on/off and directions buttons and with an arched hand holder at the top for the passenger, and
    wherein the joysticks are connected to the controllers.

2. The flying board of claim 1, wherein the number of circle voids is 20.

3. The flying board of claim 2, wherein electrical propulsion propellers are distributed such that each side has five propellers with a vibration damper.

4. The flying board of claim 1, wherein the electrical propulsion propellers are made of duct fans.

5. The flying board of claim 1, wherein the plurality of the electrical propulsion propellers are provided with vibration dampers.

6. The flying board of claim 1, wherein the chargeable battery is charged via the photovoltaic cells or an external source.

7. The flying board of claim 1, wherein the joysticks include connectors between electronic chips for the plurality of electrical engines and the turn on/off and directions buttons in order to give directives of taking off and landing.

8. The flying board of claim 1, wherein the controllers comprise a computer operated medium in automatic wireless manner and electronic chip for a wireless digital system, display port, power sensor port, oxygen sensor port, joystick chip port and chips ports.

9. The flying board of claim 1, further comprising installed sensors on all sides of the oval base to give alerts to the passenger about any traffic obstacles to avoid accidents and crashes.

10. The flying board of claim 1, comprising brackets below the flying board which are made from fiberglass and coated with an enhanced layer of leather and rubber which is resistant to friction.

11. A method of flying with the flying board of claim 1, the method comprising:
    generating the power by photovoltaic cells and the oxygen generator and the chargeable batteries, wherein the photovoltaic cells on the front of the flying board, and said photovoltaic cells are partially supplying the oxygen generator with the energy and the chargeable batteries storing the extra energy;
    ejecting oxygen produced by the reaction of the oxygen generator through a pair of tubes to reproduce a momentum to hover the flying board in the air along with the electrical propulsion propellers that operate by the plurality of electrical engines which are operated via the chargeable batteries as the plurality of electrical engines are positioned beside the plurality of the electrical propulsion propellers;
    distributing power and voltage through the controllers and electronic chips and a wireless digital system on all components of the flying board;
    controlling flight by the joysticks including the turn on/off and directions buttons connected to electronic chips which are connectors between the turn on/off buttons and the directions buttons with the attached electronic chips to the plurality of electrical engines in order to give directives of taking off and landing, wherein the controllers include a computer operated medium in automatic wireless manner and electronic chip for a wireless digital system, display port, power sensor port, oxygen sensor port, joystick chip port and chips ports;
    avoiding accidents and crashes by using installed sensors on all sides of the oval base to give alerts to the passenger about any traffic obstacles to avoid the accidents and crashes.

* * * * *